United States Patent
Fang et al.

(10) Patent No.: US 11,695,195 B2
(45) Date of Patent: Jul. 4, 2023

(54) SELF-SUPPORTING ANTENNA

(71) Applicant: 3M INNOVATIVE PROPERTIES COMPANY, St. Paul, MN (US)

(72) Inventors: Ya-Peng Fang, Shanghai (CN); Jinbae Kim, Seoul (KR); Jung-ju Suh, Seoul (KR); Jeongwan Choi, Seoul (KR); Minji Kim, Seoul (KR)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 386 days.

(21) Appl. No.: 16/311,266

(22) PCT Filed: Jun. 21, 2016

(86) PCT No.: PCT/CN2016/086539
§ 371 (c)(1),
(2) Date: Dec. 19, 2018

(87) PCT Pub. No.: WO2017/219233
PCT Pub. Date: Dec. 28, 2017

(65) Prior Publication Data
US 2019/0334223 A1    Oct. 31, 2019

(51) Int. Cl.
*H01Q 1/22*         (2006.01)
*G06K 19/077*       (2006.01)
(Continued)

(52) U.S. Cl.
CPC ......... *H01Q 1/2225* (2013.01); *G06K 19/025* (2013.01); *G06K 19/077* (2013.01);
(Continued)

(58) Field of Classification Search
CPC ...... H01Q 1/2225; H01Q 1/14; G06K 19/025; G06K 19/07783; H04B 5/0031; H04B 5/0062
See application file for complete search history.

(56) References Cited

U.S. PATENT DOCUMENTS 4,874,548 A * 10/1989 Hajovsky ................. H01B 1/24
                                                  252/511
5,428,214 A *  6/1995 Hakkers ........... G06K 19/07749
                                                  235/492
(Continued)

FOREIGN PATENT DOCUMENTS

CN   101420064   4/2009
CN   101488196   7/2009
(Continued)

OTHER PUBLICATIONS

International Search report for PCT International Application No. PCT/CN2016/086539 dated Mar. 28, 2017, 7 pages.

*Primary Examiner* — Ab Salam Alkassim, Jr.
(74) *Attorney, Agent, or Firm* — Jonathan L. Tolstedt

(57) ABSTRACT

An antenna includes a self-supporting electrically conductive wire having a width (W) and extending longitudinally along a length and between first and second ends of the conductive wire. The conductive wire forms one or more loops and comprises an electrically conductive layer disposed on and aligned with an adhesive layer. A width and a length of each of the conductive and adhesive layers are substantially co-extensive with the width and the length of the conductive wire.

13 Claims, 7 Drawing Sheets

(51) Int. Cl.
*H01Q 7/00* (2006.01)
*G06K 19/02* (2006.01)
*H01Q 1/14* (2006.01)
*H04B 5/00* (2006.01)

(52) U.S. Cl.
CPC ......... *G06K 19/07783* (2013.01); *H01Q 1/14* (2013.01); *H01Q 7/00* (2013.01); *H04B 5/0031* (2013.01); *H04B 5/0062* (2013.01); *B32B 2519/02* (2013.01)

(56) References Cited

U.S. PATENT DOCUMENTS

| | | | |
|---|---|---|---|
| 5,541,399 A * | 7/1996 | de Vall | G06K 19/0776 235/491 |
| 6,951,596 B2 | 10/2005 | Green | |
| 7,315,248 B2 | 1/2008 | Egbert | |
| 7,323,994 B2 | 1/2008 | Yamagajo | |
| 7,370,808 B2 | 5/2008 | Eastin | |
| 7,911,733 B2 | 3/2011 | Deeken | |
| 8,099,335 B2 | 1/2012 | Eckstein | |
| 8,849,954 B2 | 9/2014 | Kim | |
| 8,853,562 B2 | 10/2014 | Izawa et al. | |
| 8,973,833 B2 | 3/2015 | Kikiuchi | |
| 9,426,878 B2 * | 8/2016 | Choi | C09J 7/205 |
| 9,609,792 B2 | 3/2017 | Su | |
| 2002/0011967 A1 * | 1/2002 | Goff | H01Q 1/2225 343/895 |
| 2004/0174257 A1 * | 9/2004 | Kuhns | G06K 19/07779 428/209 |
| 2005/0034995 A1 | 2/2005 | Gundlach | |
| 2005/0057430 A1 * | 3/2005 | Noguchi | H01Q 5/321 343/702 |
| 2005/0231429 A1 * | 10/2005 | Noguchi | H01Q 11/08 343/788 |
| 2009/0071703 A1 * | 3/2009 | Imahori | H05K 3/361 174/250 |
| 2009/0200382 A1 * | 8/2009 | Kwon | G06K 19/077 29/601 |
| 2010/0127084 A1 * | 5/2010 | Pavate | G06K 19/07783 29/601 |
| 2012/0286902 A1 * | 11/2012 | Michalk | H05K 1/162 156/60 |
| 2012/0312879 A1 * | 12/2012 | Rolin | G07F 7/0846 235/492 |
| 2014/0265620 A1 * | 9/2014 | Hoarau | H01F 38/14 307/104 |
| 2014/0284386 A1 * | 9/2014 | Finn | B23K 26/361 343/866 |
| 2017/0213648 A1 * | 7/2017 | Joyce | H01Q 1/2225 |

FOREIGN PATENT DOCUMENTS

| | | | |
|---|---|---|---|
| CN | 101896058 | | 11/2010 |
| CN | 1988257 | | 11/2011 |
| CN | 102339411 | * | 2/2012 |
| CN | 102339411 A | * | 2/2012 |
| CN | 103763893 | | 4/2014 |
| CN | 104463312 | | 5/2018 |
| KR | 2012-0080394 | | 1/2011 |

* cited by examiner

SELF-SUPPORTING ANTENNA

CROSS REFERENCE TO RELATED APPLICATIONS

This application is a national stage filing under 35 U.S.C. 371 of PCT/CN2016/086539, filed Jun. 21, 2016, also first filed case in family.

TECHNICAL FIELD

This application relates generally to antenna structures and to devices and methods related to such antenna structures.

BACKGROUND

Wireless communication circuits are widely used for local communication for a variety of applications such as radio frequency identification (RFID) and near-field communications (NFC). In addition to their cellular communication capabilities, portable devices such as cellular telephones and tablets may communicate wirelessly with a variety of other close rang communication circuits over distances of about 20 cm or less. The close range wireless communication signals are transferred between antennas of the communicating devices. As hand held devices become smaller, thinner, and less expensive, antenna technology is needed that meets the performance, size, and cost specifications for antennas that enable close range communication.

BRIEF SUMMARY

Some embodiments involve an antenna comprising a self-supporting electrically conductive wire having a width (W) and extending longitudinally along a length and between first and second ends of the conductive wire. The conductive wire forms one or more loops and comprises an electrically conductive layer disposed on and aligned with an adhesive layer. A width and a length of each of the conductive and adhesive layers are substantially co-extensive with the width and the length of the conductive wire.

According to some embodiments, a handheld device comprises an antenna structure that includes a battery, an electromagnetic interference suppression film disposed on the battery, and the antenna described above disposed on the electromagnetic interference suppression film.

Some embodiments involve a radio frequency identification (RFID) tag adapted to wirelessly communicate with a remote transceiver. The RFID tag includes a flexible substrate with the self-supporting antenna described above disposed on a major surface of the substrate. A first terminal is disposed at and in electrical communication with the first end of the antenna and a second terminal is disposed at and in electrical communication with the second end of the antenna. The RFID tag includes a pad portion adjacent the antenna between the first and second ends of the antenna for mounting an integrated circuit. The pad portion is in electrical communication with the antenna.

In some embodiments, a self-supporting antenna having a maximum lateral dimension in a range from about 15 mm to about 150 mm comprises an elongated electrically conductive ridge forming a spiral. The self-supporting antenna has a maximum lateral dimension in a range from about 15 mm to about 150 mm. The electrically conductive ridge has a width (W) in a range from about 100 microns to about 1000 microns and a height (H) in a range from about 15 microns to about 400 microns. The electrically conductive ridge extends longitudinally along a length between first and second ends of the conductive ridge. When the self-supporting antenna is held in air from an edge of the antenna, a maximum curl of the antenna is less than a predetermined value.

Some embodiments are directed to a method of making a self-supporting antenna. The method includes cutting through at least the adhesive and the conductive films of a multilayer stack. The cutting pattern for cutting through the multilayer stack includes two parallel winding cutting lines forming a cut spiral ridge. After the cutting, the spiral ridge may be removed from the remainder of the multilayer stack to form a self-supporting electrically conductive antenna.

These and other aspects of the present application will be apparent from the detailed description below. In no event, however, should the above summaries be construed as limitations on the claimed subject matter, which subject matter is defined solely by the attached claims.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DESCRIPTION OF ILLUSTRATIVE EMBODIMENTS

Some embodiments disclosed herein are directed to a self-supporting antenna that can be used to facilitate communication between two devices. The self-supporting antenna is able to be picked up and manipulated without substantially losing its shape, a characteristic that is particularly useful during installation of the antenna into housing, for example.

Some embodiments disclosed herein are directed to an electromagnetic interference shielding film that is flexible, allowing the shielding film to conform closely to the topography of integrated circuits disposed on a printed circuit board.

Figure 1:
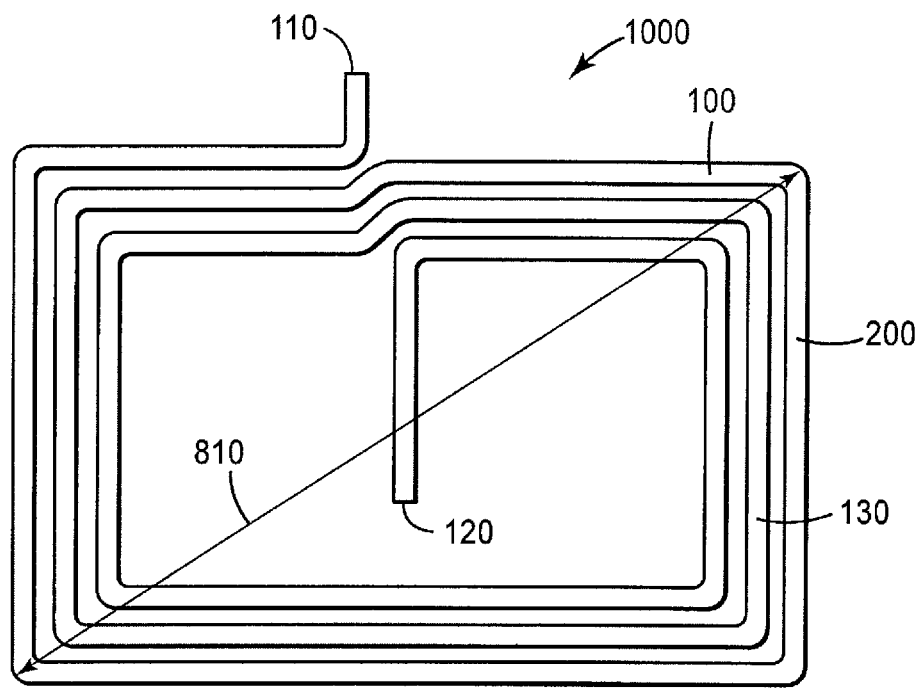
FIG. 1 illustrates a first surface of a self-supporting antenna in accordance with some embodiments.
Figure 2:
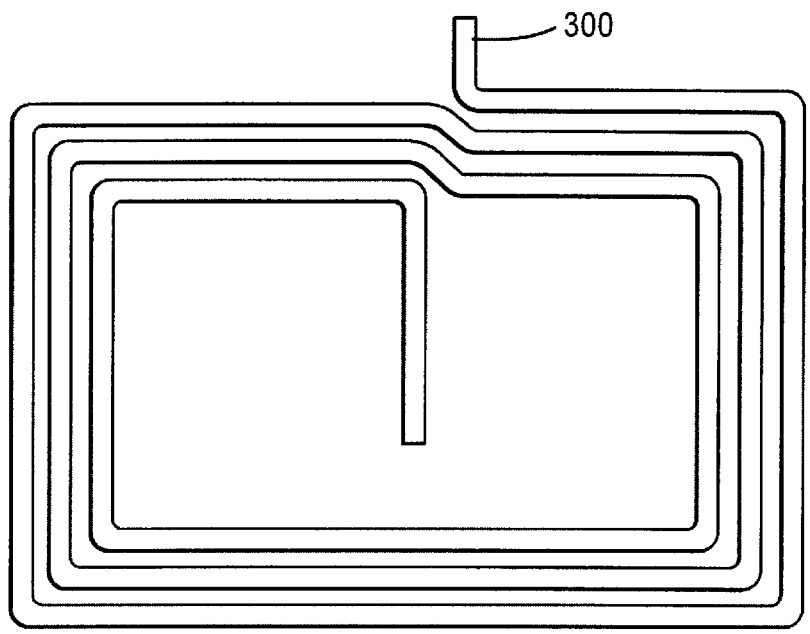
FIG. 2 illustrates an opposing second surface of the self-supporting antenna of FIG. 1.
Figure 9:
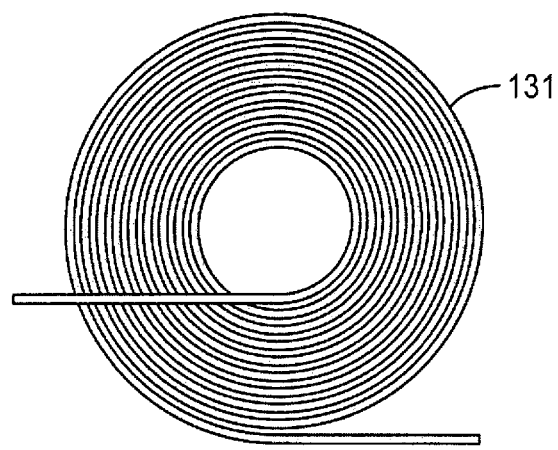
FIG. 9 illustrates a self-supporting antenna that includes loops arranged to form a spiral in accordance with some embodiments.

FIG. 1 illustrates a first surface and FIG. 2 illustrates an opposing second surface of a self-supporting antenna 1000 comprising a self-supporting electrically conductive wire 100. The conductive wire 100 comprises an electrically conductive layer 200 disposed on and aligned with an adhesive layer 300. The conductive wire has a width (W) and a height (H) and extends longitudinally along a length and between first 110 and second 120 ends of the conductive wire 100. The width and length of each of the conductive layer 200 and the adhesive layer 300 is substantially co-extensive with the width and the length of the conductive wire 100. The wire 100 may comprise an elongated electrically conductive ridge, for example. In some embodiments, the antenna 1000 may include one or more loops 130, e.g., loops that form a spiral. Each of the one or more loops may be a substantially rectangular loop as depicted in FIG. 1 or may be a substantially circular loop 131 as depicted by the spiral loop of FIG. 9.

Figure 3A:
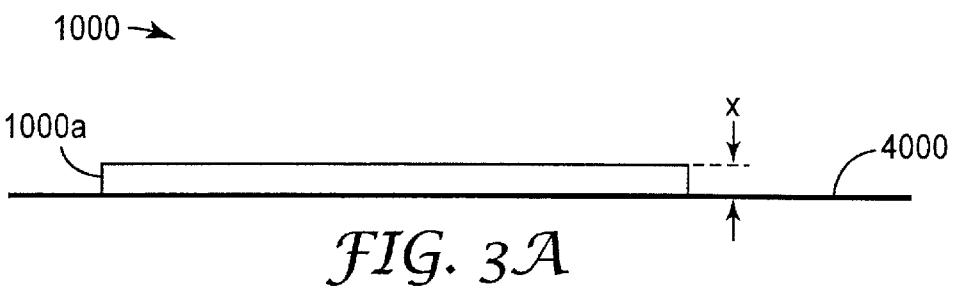
FIG. 3A shows a side view of the self-supporting antenna lying in a plane on a surface illustrating the original planar thickness of the antenna, X.
Figure 3B:
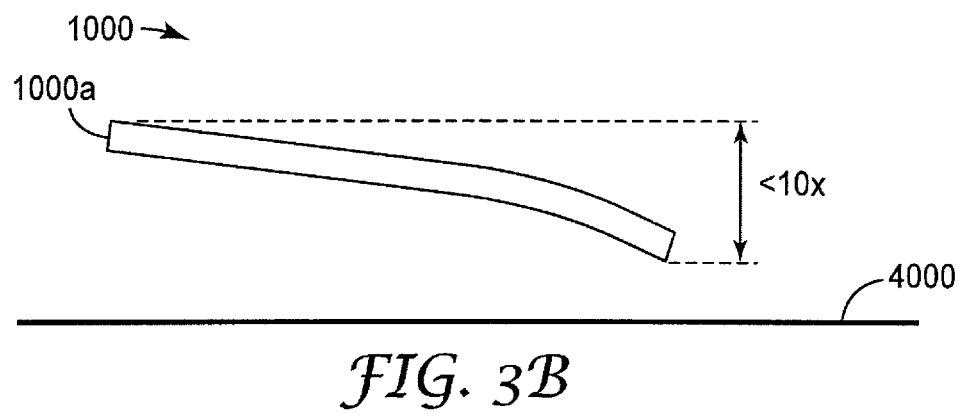
FIG. 3B illustrates the self-supporting antenna of FIG. 3A held at an edge in air.

The self-supporting antenna 1000 has a maximum curl that is less than a predetermined value. For example, the self-supporting nature of the antenna 1000 means that it is able to be picked up and manipulated without substantially losing its shape. When picked up by an edge, the loops 130 of the antenna 1000 do not substantially fall out of place and the antenna 1000 does not substantially curl onto itself. FIG. 3A shows a side view of the antenna 1000 lying in a plane on a surface 4000, wherein an original planar thickness of the antenna 1000 is X. As illustrated in FIG. 3B, when the antenna 1000 is picked up by an edge 1000a, lifted from the surface 4000, and held in air, the thickness of the self-supporting antenna 1000 increases by less than 10 times the planar thickness, X, less than 5 times the planar thickness, X, or even less than 2 times the planar thickness, X.

Figure 4:
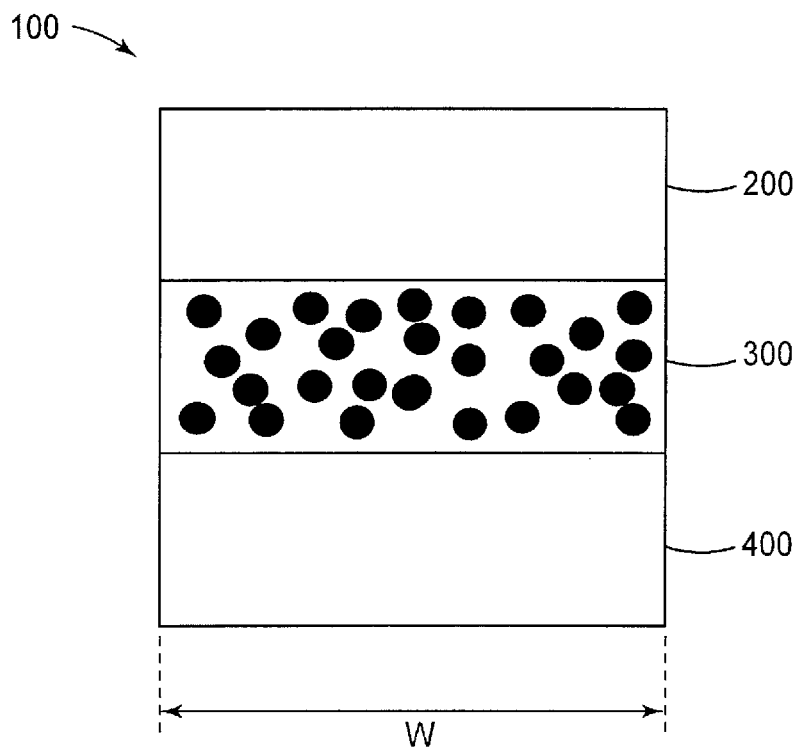
FIG. 4 shows a self-supporting conductive wire adhered to a release layer via the adhesive layer wherein the release layer extends across several loops of the wire in accordance with some embodiments.
Figure 5:
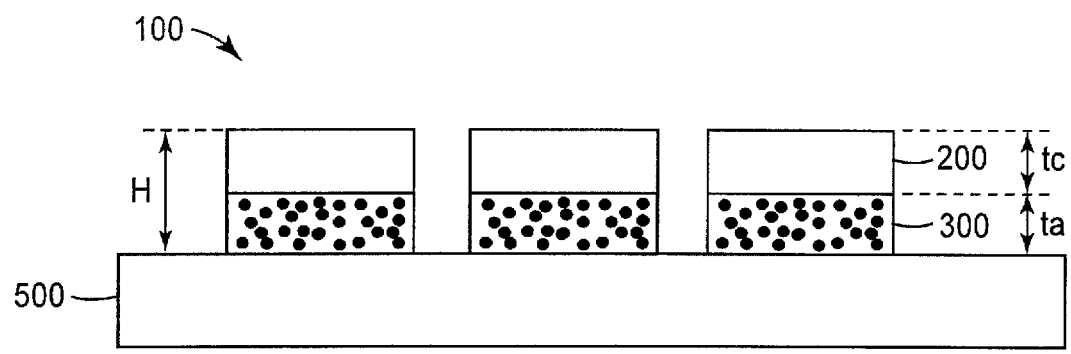
FIG. 5 shows a self-supporting conductive wire adhered to a release layer via the adhesive layer wherein the release layer is co-extensive widthwise and lengthwise with the conductive wire and extends across a single loop of the conductive wire in accordance with some embodiments.

As shown in FIGS. 4 and 5, in some embodiments, the self-supporting conductive wire 100 adheres to a release layer 400, 500 via the adhesive layer 300. Removal of the release layer 400, 500 exposes the adhesive layer 300. In some embodiments, as illustrated by FIG. 4, the release layer 500 may be wider and/or longer than the conductive wire 100 and may extend between and across several loops of the wire 100. Alternatively, as illustrated in FIG. 5, the release layer 400 may be co-extensive widthwise and lengthwise with the conductive wire 100.

The self-supporting antenna 1000 may have a maximum lateral dimension 810 in a range from 5 mm to about 200 mm, or about 15 mm to about 150 mm, for example. The conductive wire 100, e.g., conductive ridge, may have a width (W) in a range from about 100 microns to about 10 mm, or from about 100 microns to about 1000 microns, for example. The conductive wire 100 may have a height (H) in a range from about 15 microns to about 400 microns, for example. A thickness, $t_c$, of the conductive layer 200 may be in a range from about 5 microns to about 150 microns, for example. A thickness, $t_a$, of the adhesive layer may be in a range from about 10 microns to about 250 microns, for example.

Figure 6:
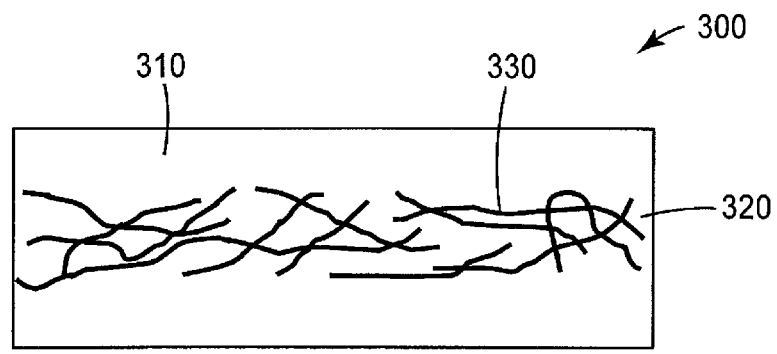
FIG. 6 depicts an adhesive layer comprising an adhesive at least partially embedded in a non-woven material in accordance with some embodiments.

The adhesive layer 300 may comprise an adhesive 310 at least partially embedded in a non-woven material 320, as depicted in FIG. 6. The non-woven material may comprise at least one of a polyester, a polyimide, a polycarbonate, a polyolefin, a polyurethane, a polyamide, and a polyacrylate. The non-woven material can include a plurality of fibers 330. At least some of the fibers 330 may be electrically conductive.

Figure 7:
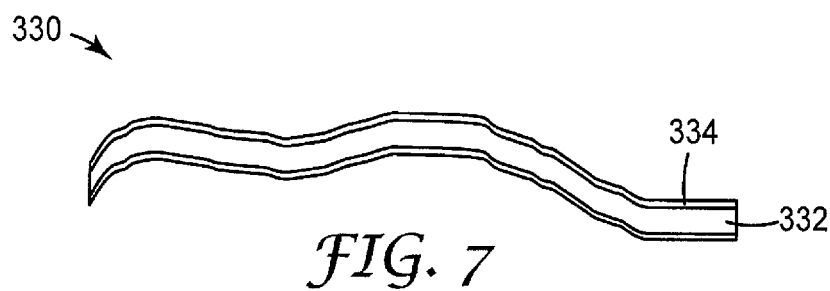
FIG. 7 provides a cross sectional view of an electrically conductive fiber in accordance with some embodiments.

FIG. 7 depicts a cross sectional view of an electrically conductive fiber 330. The fiber 330 includes an electrically insulative fiber 332 coated with an electrically conductive material 334. The electrically conductive material 334 may comprise a metal. For example, the fibers 330 may be dip coated or vapor coated with a conductive material, such as copper.

Figure 8:
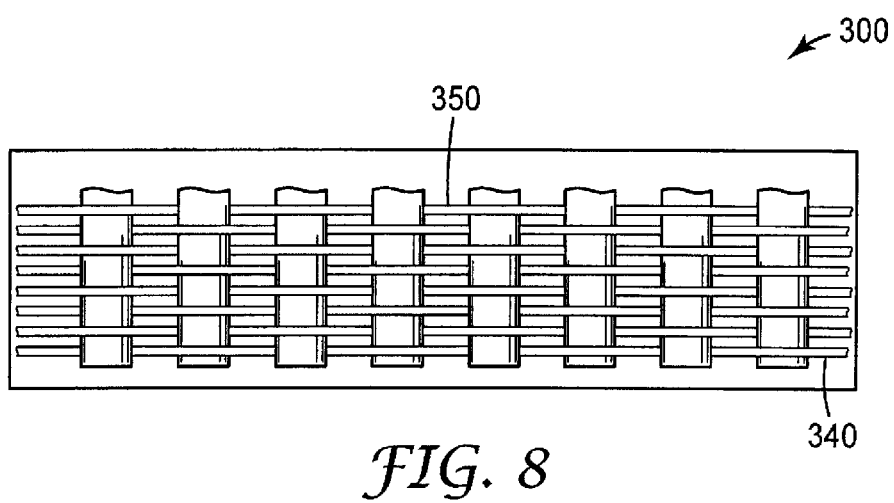
FIG. 8 shows an adhesive layer that includes an adhesive at least partially embedded in a woven material in accordance with some embodiments.

As shown in FIG. 8, the adhesive layer 300 may include an adhesive 310 at least partially embedded in a woven material 340. The woven material 340 can include at least one of a polyester, a polyimide, a polycarbonate, a polyolefin, a polyurethane, a polyamide, and a polyacrylate, for example. In the embodiment illustrated in FIG. 8, the woven material 340 comprises a plurality of fibers 350. In some implementations, at least some of the fibers 350 are electrically conductive. As previously discussed in connection with FIG. 7, the electrically conductive fibers 350 may comprise electrically insulative fibers 332 coated with an electrically conductive material 334.

Figure 10:
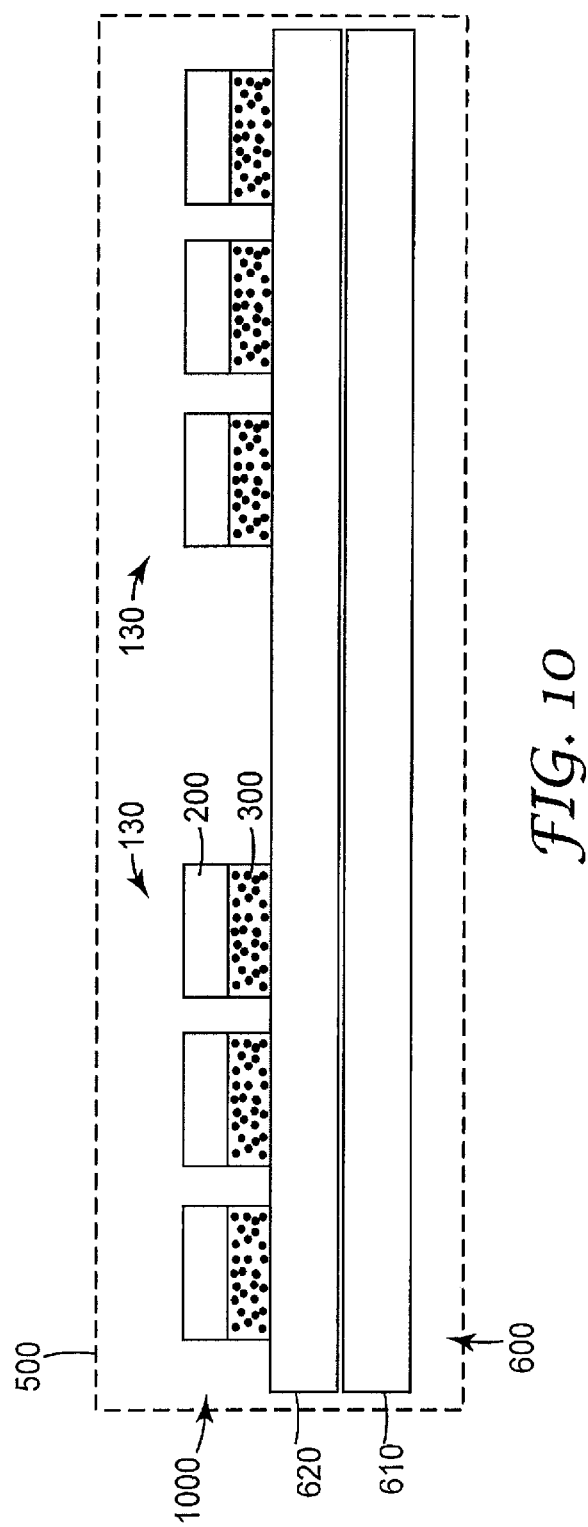
FIG. 10 illustrates a handheld device that includes an antenna structure in accordance with some embodiments.

The self-supporting antenna 1000 discussed above may be incorporated into a variety of devices. For example, the self-supporting antenna 1000 may provide communication capabilities for a hand held device. FIG. 10 illustrates a handheld device 5000 that includes an antenna structure 600 in accordance with some embodiments. The antenna structure 600 comprises a battery 610, an electromagnetic interference suppression film 620 disposed on the battery, and a self-supporting antenna 1000 disposed on the electromagnetic interference suppression film. The self-supporting antenna includes a self-supporting electrically conductive wire 100 forming one or more loops 130 and comprising an electrically conductive layer 200 disposed on and aligned with an adhesive layer 300. A width and a length of each of the conductive and adhesive layers are substantially co-extensive with the width and the length of the conductive wire 100 in this example.

Figure 11:
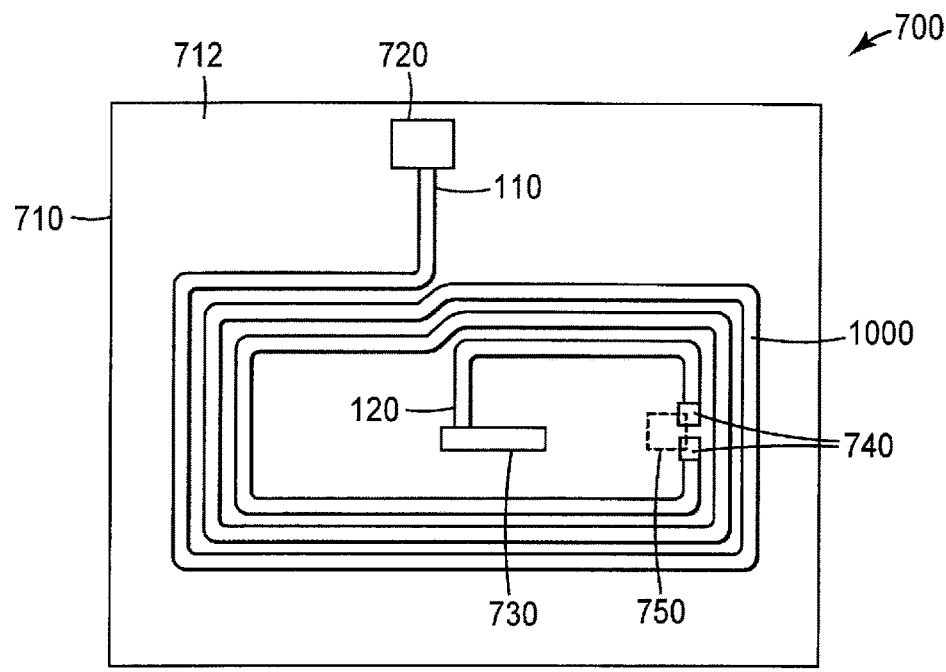
FIG. 11 depicts a radio frequency identification (RFID) tag adapted to wirelessly communicate with a remote transceiver in accordance with some embodiments.

An example implementation of the self-supporting antenna 1000 is to provide a communication antenna for a radio frequency identification (RFID) tag 700 adapted to wirelessly communicate with a remote transceiver as shown in FIG. 11. The RFID tag 700 comprises a flexible substrate 710 and an antenna 1000 disposed on a major surface 712 of the substrate 710. The self-supporting antenna 1000 includes a self-supporting electrically conductive wire 100 having a width (W) and extending longitudinally along a length between first 110 and second 120 ends of the conductive wire 100. The conductive wire 100 may form one or more loops 130. An electrically conductive layer 200 of the antenna 1000 is disposed on and aligned with an adhesive layer 300. The width and length of each of the conductive 200 and adhesive 300 layers may be substantially co-extensive with the width and the length of the conductive wire 100.

The RFID tag 700 can have a first terminal 720 disposed at and in electrical communication with the first end 110 of the antenna 1000. A second terminal 730 of the RFID tag 700 can be disposed at the second end 120 of the antenna 1000 and in electrical communication with the antenna 1000. A pad portion 740 of the RFID tag is adjacent the antenna 1000 between the first 110 and second 120 ends of the antenna 1000. The pad portion 740 is in electrical communication with the antenna 1000 and is configured to allow the mounting an integrated circuit. In some embodiments, the RFID tag 700 includes an integrated circuit 750 disposed on and in electrical communication with the pad portion 740. The RFD tag 700 may be tuned to communication at a radio frequency (RF), e.g. a frequency of about 13.56 MHz.

Figure 12:
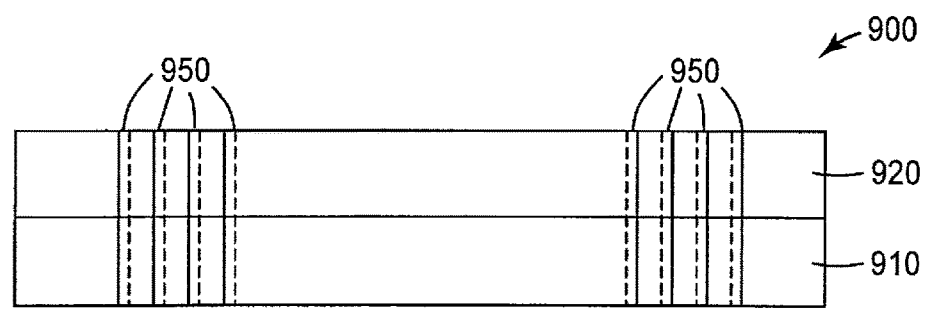
FIGS. 12 and 13 illustrate a method of making a self-supporting antenna according to some embodiments.
Figure 13:
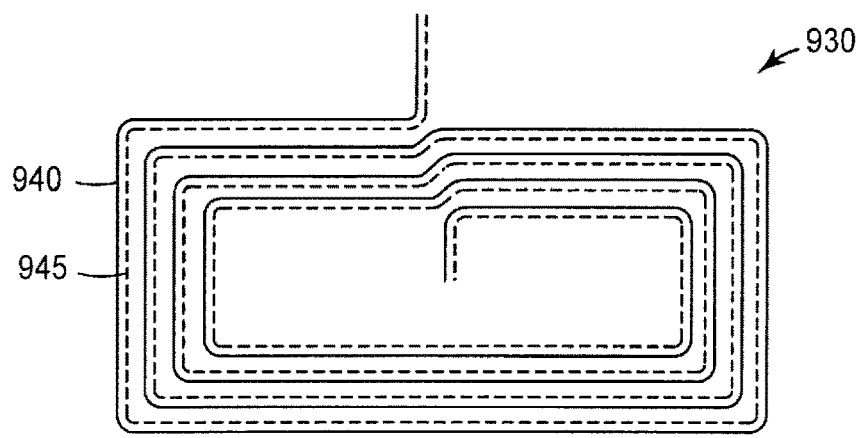

FIGS. 12 and 13 illustrate a method of making a self-supporting antenna according to some embodiments. The self-supporting antenna 1000 can be made by cutting a multilayer stack 900 that includes an adhesive film 910 and an electrically conductive film 920 disposed on the adhesive film 910. FIG. 12 is a cross sectional view and FIG. 13 is a top view of a multilayer stack 900 that may be cut to form a self-supporting antenna. The method of making the antenna includes cutting through at least the adhesive 910 and the conductive films 920 of the multilayer stack 900 according to a cutting pattern 930. The cutting pattern may comprise two parallel winding cutting lines 940, 945 to form a cut spiral ridge 950. In FIGS. 12 and 13, one of the two parallel cutting lines 940 is depicted as a solid line and the other of the two parallel cutting lines 945 is depicted as a dashed line. In some embodiments the two parallel cutting lines are cut substantially simultaneously. Cutting the multilayer stack may comprise electric wire cutting, laser cutting, liquid jet cutting, die cutting, stamping, and lithography, for example. The cut spiral ridge 950 is removed to form a self-supporting electrically conductive antenna 1000.

Electromagnetic interference (EMI) can detrimentally affect the operation of electronic components. Shielding an electronic system can reduce the impact of EMI for sensitive components of a system. Shielding can also prevent excessive emission of EMI from one or more integrated circuits of an electronic system which may affect other sensitive components of the system or may affect other systems.

Figure 14:
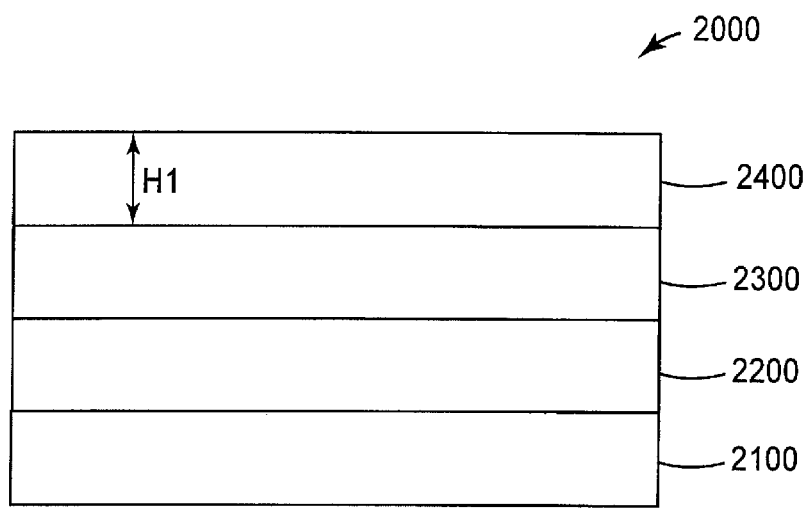
FIG. 14 is a cross sectional view of a multilayer shielding film in accordance with some embodiments.
Figure 15:
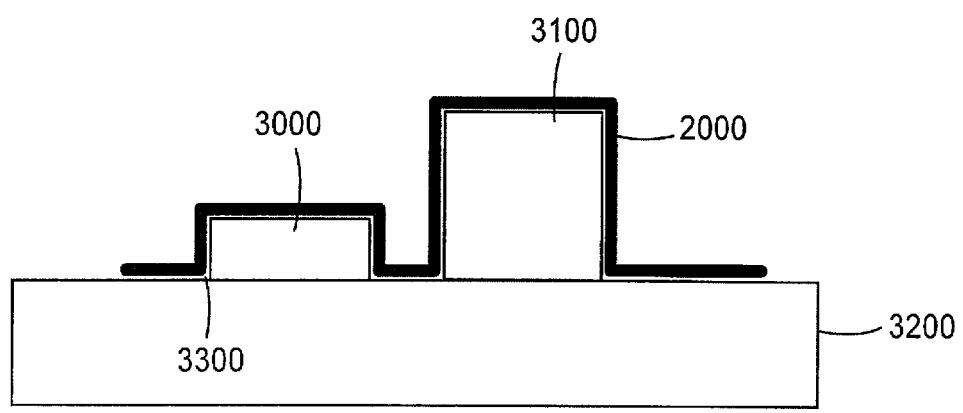
FIG. 15 illustrates the multilayer shielding film of FIG. 14 placed on an electronic device mounted on a circuit board.

Some embodiments are directed to an electromagnetic interference shielding film that is capable of conforming and adhering to a topography having features of variable height. The multilayer shielding film is designed to conform to the surface of objects on a substrate, such as electronic devices mounted on a circuit board. FIG. 14 is a cross sectional view of a multilayer shielding film 2000 in accordance with some embodiments. The multilayer shielding film includes a first adhesive layer 2100. An electrically insulative mesh fabric layer 2200 is disposed on the first adhesive layer 2100. A second adhesive layer 2300 is disposed on the mesh fabric layer 2200. A metal layer 2400 is disposed on the second adhesive layer 2300, wherein the thickness, H1, of the metal layer is less than about 10 microns, for example. FIG. 15 illustrates the multilayer shielding film 2000 placed on an electronic device 3000, 3100 mounted on a circuit board 3200. Under application of one or more of heat, vacuum, and pressure, the multilayer shielding film 2000 conforms to one or more electronic devices 3000, 3100 and the first adhesive layer 2100 adheres to the circuit board 3200, providing a seal between the multilayer shielding film 2000 and the circuit board 3200. For example, in some implementations the multilayer shielding film 2000 provides the seal between the multilayer shielding film 2000 and the circuit board 3200 such that at least 90% of space 3300 defined between the multilayer shielding film 2000 and the circuit board 3200 is occupied by the one or more electronic devices 3000, 3100.

Embodiments disclosed herein include:

Embodiment 1. An antenna comprising a self-supporting electrically conductive wire having a width (W) and extending longitudinally along a length and between first and second ends of the conductive wire, the conductive wire forming one or more loops and comprising an electrically conductive layer disposed on and aligned with an adhesive layer, a width and a length of each of the conductive and adhesive layers being substantially co-extensive with the width and the length of the conductive wire.

Embodiment 2. The antenna of claim 1 further comprising a release layer, the self-supporting conductive wire adhering to the release layer via the adhesive layer, the release layer being removable to expose the adhesive layer.

Embodiment 3. The antenna of claim 1, wherein the self-supporting conductive wire further comprises a release layer co-extensive widthwise and lengthwise with the conductive wire and adhered to the adhesive layer, the release layer being removable to expose the adhesive layer.

Embodiment 4. The antenna of claim 1, wherein the adhesive layer comprises an adhesive at least partially embedded in a non-woven material.

Embodiment 5. The antenna of claim 4, wherein the non-woven material comprises at least one of a polyester, a polyimide, a polycarbonate, a polyolefin, a polyurethane, a polyamide, and a polyacrylate.

Embodiment 6. The antenna of claim 4, wherein the non-woven material comprises a plurality of fibers.

Embodiment 7. The antenna of claim 6, wherein at least some of the fibers in the plurality of fibers are electrically conductive.

Embodiment 8. The antenna of claim 7, wherein the electrically conductive fibers comprise insulative fibers coated with an electrically conductive material.

Embodiment 9. The antenna of claim 8, wherein the electrically conductive material comprises a metal.

Embodiment 10. The antenna of claim 1, wherein the adhesive layer comprises an adhesive at least partially embedded in a woven material.

Embodiment 11. The antenna of claim 10, wherein the woven material comprises at least one of a polyester, a polyimide, a polycarbonate, a polyolefin, a polyurethane, a polyamide, and a polyacrylate.

Embodiment 12. The antenna of claim 10, wherein the woven material comprises a plurality of fibers.

Embodiment 13. The antenna of claim 12, wherein at least some of the fibers in the plurality of fibers are electrically conductive.

Embodiment 14. The antenna of claim 13, wherein the electrically conductive fibers comprise insulative fibers coated with an electrically conductive material.

Embodiment 15. The antenna of claim 1, wherein each of the one or more loops is a substantially rectangular loop.

Embodiment 16. The antenna of claim 1, wherein each of the one or more loops is a substantially circular loop.

Embodiment 17. The antenna of claim 1, wherein the width of the self-supporting conductive wire is in a range from about 100 microns to about 10 mm.

Embodiment 18. The antenna of claim 1, wherein a thickness of the self-supporting conductive wire is in a range from about 15 microns to about 400 microns.

Embodiment 19. The antenna of claim 1, wherein a thickness of the electrically conductive layer is in a range from about 5 microns to about 150 microns.

Embodiment 20. The antenna of claim 1, wherein a thickness of the adhesive layer is in a range from about 10 microns to about 250 microns.

Embodiment 21. The antenna of claim 1 having a maximum lateral dimension in a range from about 5 mm to about 200 mm.

Embodiment 22. A handheld device comprising an antenna structure comprising:
- a battery;
- an electromagnetic interference suppression film disposed on the battery; and
- the antenna of claim 1 disposed on the electromagnetic interference suppression film.

Embodiment 23. A radio frequency identification (RFID) tag adapted to wirelessly communicate with a remote transceiver, comprising:
- a flexible substrate;
- the antenna of claim 1 disposed on a major surface of the substrate;
- a first terminal disposed at and in electrical communication with the first end of the antenna;
- a second terminal disposed at and in electrical communication with the second end of the antenna; and
- a pad portion adjacent the antenna between the first and second ends of the antenna for mounting an integrated circuit, the pad portion being in electrical communication with the antenna.

Embodiment 24. The RFID tag of claim 23 further comprising an integrated circuit disposed on and in electrical communication with the pad portion.

Embodiment 25. The RFID tag of claim 23 tuned to a frequency of about 13.56 MHz.

Embodiment 26. A self-supporting antenna having a maximum lateral dimension in a range from about 15 mm to about 150 mm, and comprising an elongated electrically conductive ridge forming a spiral, having a width (W) in a range from about 100 to about 1000 microns, a height (H) in a range from about 15 microns to about 400 microns, and extending longitudinally along a length and between first and second ends of the conductive ridge, such that when the self-supporting antenna is held in air from an edge of the antenna, a maximum curl of the antenna is less than a predetermined value.

Embodiment 27. The self-supporting antenna of claim 26, wherein when the antenna is held in air from the edge of the antenna, the thickness of the antenna increases by less than 10 times a planar thickness of the antenna.

Embodiment 28. The self-supporting antenna of claim 26, wherein when the antenna is held in air from the edge of the antenna, the thickness of the antenna increases by less than 5 times the planar thickness of the antenna.

Embodiment 29. The self-supporting antenna of claim 26, wherein when the antenna is held in air from the edge of the antenna, the thickness of the antenna increases by less than 2 times the planar thickness of the antenna.

Embodiment 30. A method of making a self-supporting antenna, comprising the steps of:
- providing a multilayer stack comprising:
  - an adhesive film; and
  - an electrically conductive film disposed on the adhesive film;
- cutting through at least the adhesive and the conductive films of the multilayer stack according to a cutting pattern comprising two parallel winding cutting lines to form a cut spiral ridge; and
- removing the cut spiral ridge to form a self-supporting electrically conductive antenna.

Embodiment 31. The method of claim 30, wherein the cutting step comprises one or more of an electric wire cutting, laser cutting, liquid jet cutting, die cutting, stamping, and lithography.

Embodiment 32. A multilayer shielding film comprising:
- a first adhesive layer;
- an electrically insulative mesh fabric layer disposed on the first adhesive layer;
- a second adhesive layer disposed on the mesh fabric layer; and
- a metal layer disposed on the second adhesive layer and having a thickness (H1) of less than about 10 microns, wherein when the multilayer shielding film is placed on an electronic device mounted on a circuit board and under application of one or more of heat, vacuum, and pressure, the multilayer shielding film conforms to the electronic device and the first adhesive layer adheres to the circuit board providing a seal between the multilayer shielding film and the circuit board.

Embodiment 33. The multilayer shielding film of claim 1, wherein when the multilayer shielding film is placed on an electronic device mounted on a circuit board and under the application of one or more of heat, vacuum, and pressure, the shielding film conforms to the electronic device and the first adhesive layer adheres to the circuit board providing the seal between the shielding film and the circuit board, at least 90% of space defined between the multilayer shielding film and the circuit board occupied by the electronic device.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of these embodiments will be apparent to those skilled in the art and it should be understood that this scope of this disclosure is not limited to the illustrative embodiments set forth herein. For example, the reader should assume that features of one disclosed embodiment can also be applied to all other disclosed embodiments unless otherwise indicated.

What is claimed is:

1. An antenna comprising a self-supporting electrically conductive wire having a width (W) and extending longitudinally along a length and between first and second ends of the conductive wire, the conductive wire forming one or more loops and comprising an electrically conductive layer disposed directly on and aligned with an adhesive layer, a width and a length of each of the conductive layer and the adhesive layer being substantially co-extensive with the width and the length of the conductive wire, and a shape of each layer present in the antenna as seen in a plan view being substantially similar to a shape of the conductive wire as seen in a plan view, wherein the adhesive layer comprises an adhesive at least partially embedded in a non-woven material and comprising a plurality of insulative fibers coated with an electrically conductive material, wherein self-supporting is defined as when the antenna is held in air from the edge of the antenna, a thickness of the antenna increases by less than 10 times a planar thickness of the antenna.

2. The antenna of claim 1 further comprising a release layer, the self-supporting conductive wire adhering to the release layer via the adhesive layer, the release layer being removable to expose the adhesive layer.

3. The antenna of claim 1, wherein the self-supporting conductive wire further comprises a release layer co-extensive widthwise and lengthwise with the conductive wire and adhered to the adhesive layer, the release layer being removable to expose the adhesive layer.

4. The antenna of claim 1, wherein the non-woven material comprises at least one of a polyester, a polyimide, a polycarbonate, a polyolefin, a polyurethane, a polyamide, and a polyacrylate.

5. The antenna of claim 1, wherein each of the one or more loops is a substantially rectangular loop.

6. The antenna of claim 1, wherein each of the one or more loops is a substantially circular loop.

7. A handheld device comprising an antenna structure comprising:
   a battery;
   an electromagnetic interference suppression film disposed on the battery; and
   the antenna of claim 1 disposed on the electromagnetic interference suppression film.

8. A radio frequency identification (RFID) tag adapted to wirelessly communicate with a remote transceiver, comprising:
   a flexible substrate;
   the antenna of claim 1 disposed on a major surface of the substrate;
   a first terminal disposed at and in electrical communication with the first end of the antenna;
   a second terminal disposed at and in electrical communication with the second end of the antenna; and
   a pad portion adjacent the antenna between the first and second ends of the antenna for mounting an integrated circuit, the pad portion being in electrical communication with the antenna.

9. A self-supporting antenna having a maximum lateral dimension in a range from about 15 mm to about 150 mm, and comprising an elongated electrically conductive cut spiral ridge formed from an electrically conductive film disposed directly on and aligned with an adhesive layer, the electrically conductive film having a width (W) in a range from about 100 to about 1000 microns, a height (H) in a range from about 15 microns to about 400 microns, and extending longitudinally along a length and between first and second ends of the conductive cut spiral ridge, such that when the self-supporting antenna is held in air from an edge of the antenna, the thickness of the antenna increases by less than 10 times a planar thickness of the antenna.

10. The self-supporting antenna of claim 9, wherein when the antenna is held in air from the edge of the antenna, the thickness of the antenna increases by less than 5 times the planar thickness of the antenna.

11. The self-supporting antenna of claim 9, wherein when the antenna is held in air from the edge of the antenna, the thickness of the antenna increases by less than 2 times the planar thickness of the antenna.

12. An antenna comprising a self-supporting electrically conductive wire having a width (W) and extending longitudinally along a length and between first and second ends of the conductive wire, the conductive wire forming one or more loops and comprising an electrically conductive layer disposed directly on and aligned with an adhesive layer, a width and a length of each of the conductive layer and the adhesive layer being substantially co-extensive with the width and the length of the conductive wire, and a shape of each layer present in the antenna as seen in a plan view being substantially similar to a shape of the conductive wire as seen in a plan view, wherein the adhesive layer comprises an adhesive at least partially embedded in a woven material and comprising a plurality of insulative fibers coated with an electrically conductive material, wherein self-supporting is defined as when the antenna is held in air from the edge of the antenna, a thickness of the antenna increases by less than 10 times a planar thickness of the antenna.

13. The antenna of claim 12, wherein the woven material comprises at least one of a polyester, a polyimide, a polycarbonate, a polyolefin, a polyurethane, a polyamide, and a polyacrylate.

* * * * *